United States Patent
Drapala et al.

(10) Patent No.: US 8,560,776 B2
(45) Date of Patent: Oct. 15, 2013

(54) METHOD FOR EXPEDITING RETURN OF LINE EXCLUSIVITY TO A GIVEN PROCESSOR IN A SYMMETRIC MULTIPROCESSING DATA PROCESSING SYSTEM

(75) Inventors: Garrett M. Drapala, Poughkeepsie, NY (US); Pak-kin Mak, Poughkeepsie, NY (US); Vesselina K. Papazova, Highland, NY (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 12/021,403

(22) Filed: Jan. 29, 2008

(65) Prior Publication Data

US 2009/0193194 A1 Jul. 30, 2009

(51) Int. Cl.
*G06F 12/00* (2006.01)
(52) U.S. Cl.
USPC .... 711/132; 711/141; 711/124; 711/E12.038; 711/E12.034
(58) Field of Classification Search
USPC ........... 711/132, 141, 124, E12.038, E12.034
See application file for complete search history.

(56) References Cited

U.S. PATENT DOCUMENTS

| | | | | |
|---|---|---|---|---|
| 4,663,706 A | * | 5/1987 | Allen et al. | 709/234 |
| 5,185,871 A | * | 2/1993 | Frey et al. | 712/205 |
| 5,265,232 A | * | 11/1993 | Gannon et al. | 711/124 |
| 5,392,397 A | | 2/1995 | Elko et al. | |
| 5,953,510 A | | 9/1999 | Herzl et al. | |
| 6,751,705 B1 | | 6/2004 | Solomon et al. | |
| 6,865,695 B2 | | 3/2005 | Joyner et al. | |
| 6,981,106 B1 | * | 12/2005 | Bauman et al. | 711/146 |
| 2002/0004810 A1 | * | 1/2002 | Reneris | 709/104 |
| 2005/0198459 A1 | | 9/2005 | Bogin et al. | |
| 2006/0224837 A1 | * | 10/2006 | Blumrich et al. | 711/146 |
| 2007/0053375 A1 | * | 3/2007 | Kurosawa | 370/450 |

OTHER PUBLICATIONS

Krugowski, Probabilistic Updating for Store-In Cache Cross-Interrogation, IBM TDB, Mar. 1, 1984, TDB Mar. 1984, pp. 5504-55-5.

* cited by examiner

*Primary Examiner* — Larry Mackall
(74) *Attorney, Agent, or Firm* — Cantor Colburn LLP; John Campbell

(57) ABSTRACT

A method and apparatus for eliminating, in a multi-nodes data handling system, contention for exclusivity of lines in cache memory through improved management of system buses, processor cross-invalidate stacks, and the system operations that can lead to these requested cache operations being rejected.

20 Claims, 3 Drawing Sheets

METHOD FOR EXPEDITING RETURN OF LINE EXCLUSIVITY TO A GIVEN PROCESSOR IN A SYMMETRIC MULTIPROCESSING DATA PROCESSING SYSTEM

FIELD AND BACKGROUND OF INVENTION

If one examines a typical symmetric multiprocessing computer system having a plurality of nodes interconnected through a given bus topology, it would typically be observed that when a request for a cache line is sent from one node to the next, through any of a number of protocols, the request would enter the remote pipeline at some point and, if necessary, generate a cross-invalidate request, during this pipe pass, to any of a number of processors on the remote node, as part of a process to obtain coherent ownership of the line for the requesting processor.

Normally, when a requester is trying to send a cross-invalidate request, for any of a given number of reasons, this cross-invalidate request can be rejected, which results in the requester having to make additional pipe passes to send this request, if it is necessary. This reject typically occurs as a result of bus conflicts, limitation in the processor as to how many cross-invalidate requests it can queue up (bias full), system throttling, or any of a number of other reasons that are typical to a multiprocessor system.

These conflicts result in additional delay in processing various operations and wasted pipe utilization/pipe passes as other operations could more efficiently utilize the system pipeline when compared to a request that is rejected for the primary operation that it was trying to accomplish during a given pipe pass.

Typically this type of behavior is considered a normal part of a multiprocessor system design and the impact that it has on the overall performance of the system is taken as a normal scaling effect in the system. As a result, little has been done to optimize this region, as the gains in additional processing power for each added processor in the system normally greatly exceed the system degradation that results from increased contention at the level of the shared cache(s).

SUMMARY OF THE INVENTION

The invention disclosed here is a method for eliminating this contention through improved management of the system buses, the processor cross-invalidate stacks, and the system operations that can lead to these operations being rejected.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
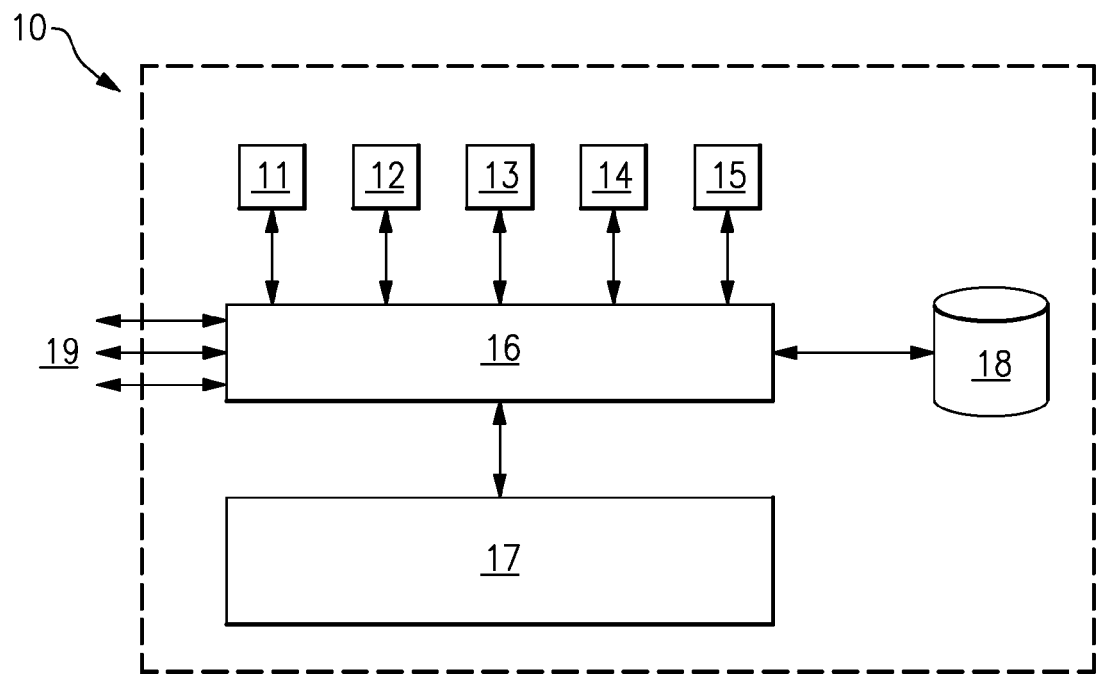
FIG. 1 illustrates the general contents of a node within the context of a multi-node system.

Turning now to the drawings in greater detail, in FIG. 1 a node containing a symmetric multiprocessing computer system, 10, can be seen consisting of a plurality of processors with associated cache and directory, 11-15, interconnected by a shared level of cache with associated directory, 16, with storage shared amongst the systems processors, 17, and common I/O devices, 18, interconnected to other nodes within a multi-node system through a plurality of interconnect buses, 19.

A fetch request targeting a given line entering the system can be initiated by any of the plurality of processors, 11-15, that upon missing the processors private cache will traverse the system in search of a target line address and associated data. Upon such a miss, the request will initially enter the shared level of cache, 16, and access the cache's directory to determine if the target line exists in that level of cache. If the line exists in the shared level of cache, commonly referred to as a directory hit, the processors request will potentially be satisfied and the target lines data will be returned to the requesting processor. If a directory miss is encountered or the line exists in the shared level of cache but in a state that does not satisfy the processors request, i.e. a read-only hit when the fetch request is for exclusivity, a request will be launched to either the remote nodes through the multi-node interconnect buses, 19, or to the node's locally attached shared storage, 17.

Figure 3:
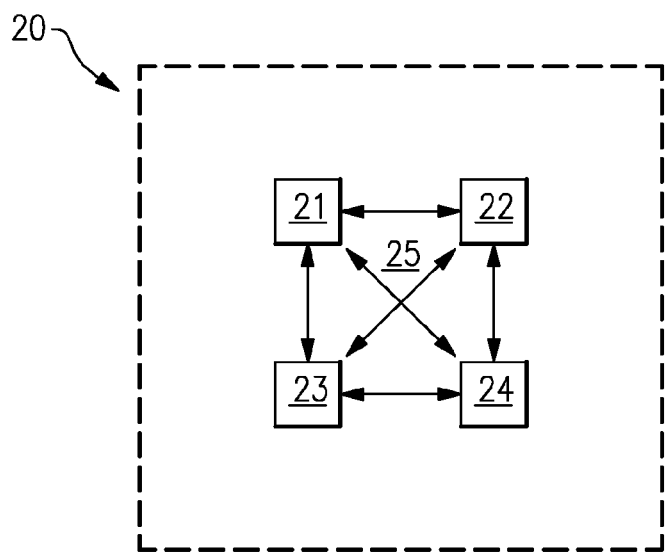
FIG. 3 illustrates a general multi-node system.
Figure 4:
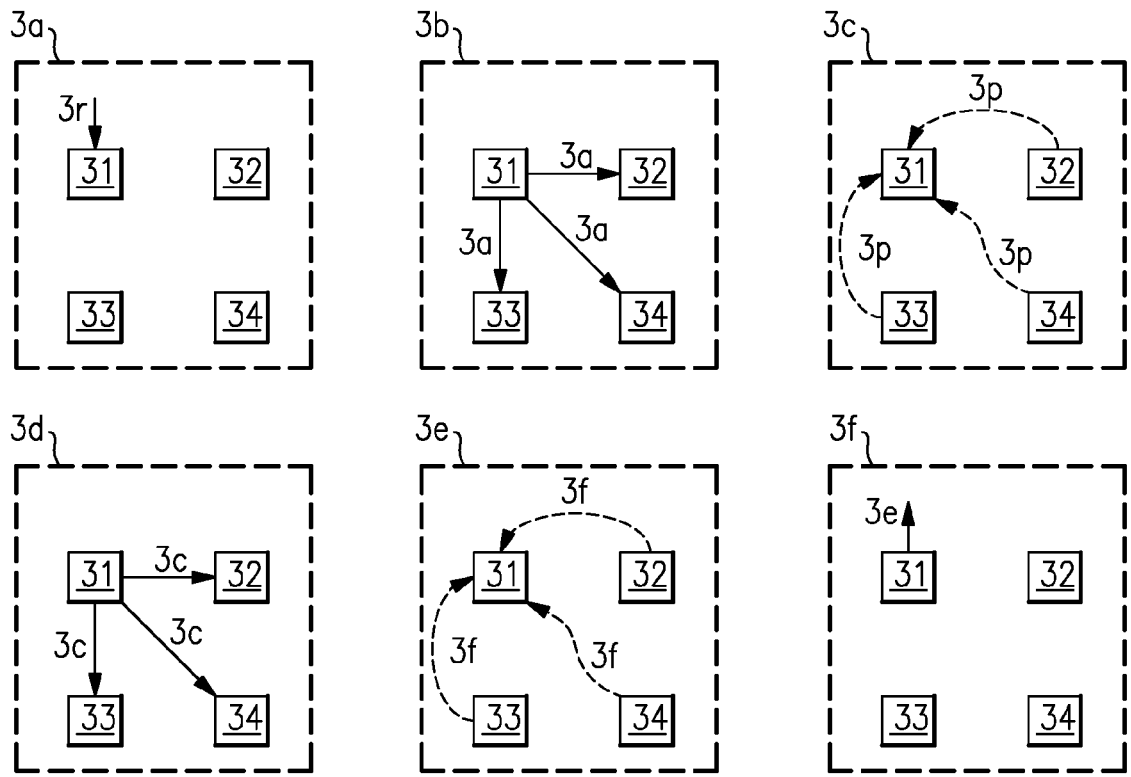
FIG. 4 illustrates a fully connected multi-node coherency protocol.

In the case of a request being launched to the remote node, we will assume a fully connected system topology, 20, as shown in FIG. 3, consisting of a plurality of interconnect buses, 25, connecting a multitude of remote nodes, 21-24, which follow a given coherency protocol. Each remote node consists of the same devices as shown in FIG. 1, providing for a plethora of processors within the multi-node system, and a larger aggregate shared level of system cache.

Each node within the multi-node system will be assumed to follow a communications protocol consisting of the following elements as detailed in FIGS. 4a through 4f. An address broadcast, 3a, a set of partial responses, 3p, a set of combined responses, 3c, and a set of final responses, 3f, which always follow each other in the respective order of generation. An initial processor request, 3r, is sent to the shared level of cache in a local node, 31, of a multiple node data handling system 30. When this request encounters a local cache miss, the node initiates a request, 3a, to each of the remote nodes, commonly referred to as an address broadcast as this request broadcasts the requesting node's fetch command and address to each of the remote nodes in the system. Upon entering the remote node, the address broadcast will lookup the directory state of the remote cache to determine the state of the target line's address in the remote cache as well as potentially sending cross-invalidate requests to the remote processor's in order to ensure that they rescind ownership of the potentially contended line. Following such a directory search, each of the remote nodes will send a partial response, 3p, back to the requesting node with information indicating the state of the line in each of the remote caches, ranging from exclusive line hit, read only line hit, miss, etc. The requesting node then takes each of the partial responses and merges them into a combined response, 3c, which indicates the coherent state of the line in the system and broadcast this response to each of the remote nodes. Upon receiving the combined response, each of the remote nodes will then proceed to manage their local cache states to ensure that upon completing processing of their respective requests the state of the line within the system is coherently managed. When the coherent handling of the line within the respective remote node is completed, each remote node will send a final response, 3f, back to the requesting node. After receiving a final response from each of the remote nodes, the requesting node is then assured that system coherency has been obtained and exclusivity of the target line can be returned to the requesting processor, 3e.

Figure 5:
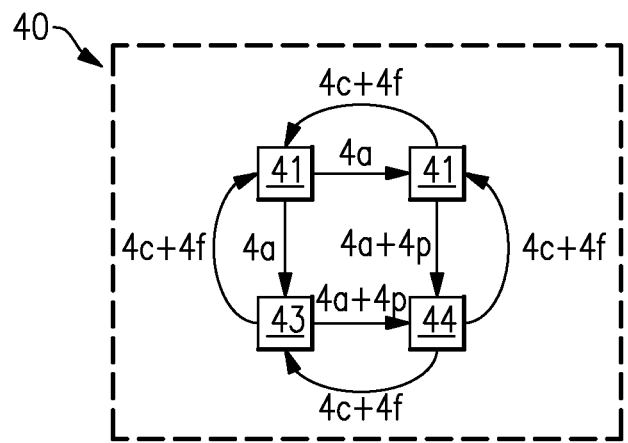
FIG. 5 illustrates a ring connected multi-node coherency protocol.

The aforementioned multi-node coherency management algorithm/communications protocol provides a perspective on prior generation coherency management algorithms within the context of a fully connected system topology. In the case of a ring interconnect topology, as show in FIG. 5, a similar protocol can generally be observed, though the partial response, 3p, would be combined with the address broadcast, 4a+4p, when the request traverses an intermediate node, and the combined and final responses, 3c and 3f respectively, would be merged to form 4c+4f in sending the response from a diagonal node back towards the requesting node.

Now within the scope of either protocol, it can be observed historically that the latency penalty incurred before a line is returned in an exclusive state to a requesting processor is dependent on the observability of the final responses within the system. As until such a point is reached, there is no guarantee that all processors on all remote nodes have given up ownership of their remote copies of the line. This is particularly true of exclusively owned lines as a processor may be currently modifying the target line and will reject any cross-interrogate requests until such a point is reached that it is conducive for it to renege ownership.

Figure 2:
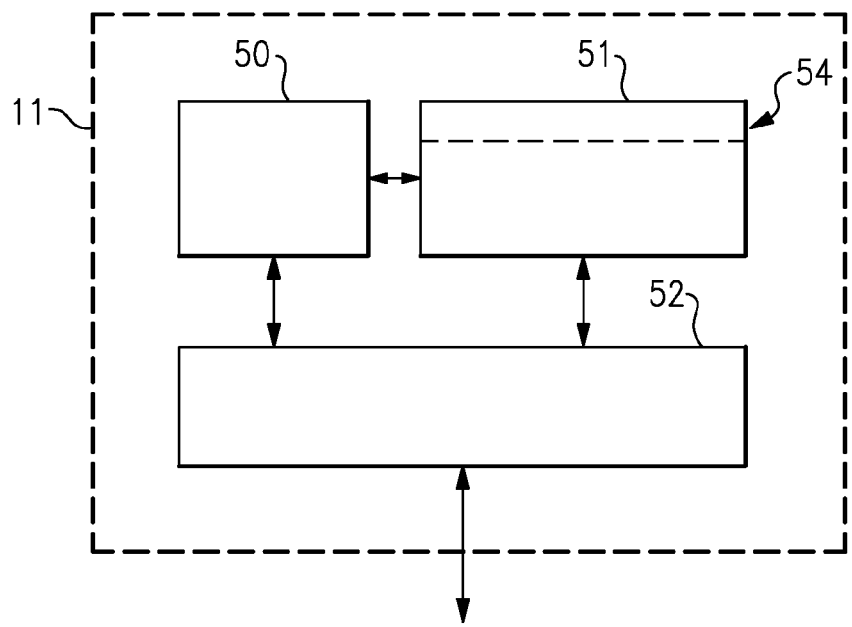
FIG. 2 illustrates certain elements of a processor within the context of FIG. 1.

Important characteristics of this invention lie in the details shown in FIG. 2, a detailed diagram of a processor core.

Considering FIG. 1, with the processor cores 11-15, it will be understood that each processor core is made up of several components that are shown in FIG. 2. These components are respectively the processor core 50, which has a corresponding bias/cross-invalidate stack 51, and an interface protocol 52. When a processor is actively working on processing a request/transaction/code segment, the processing can be said to occur entirely within element 50 which would consist of all elements of a processor core normally seen within a single processor system. In cases where the processor needs to fetch data or additional code segments from memory, it would send a request to the processor interface protocol 52 and a corresponding response would occur sometime later entering the interface protocol logic 52 which would then transfer it back to the processor core 50 and processing would continue under the normal premise of the system, regardless of architecture.

In a multi-processor system, a case exists where a processor within the system may require ownership of a line currently owned by a multitude of processors. If the processor is fetching a line for modification—an exclusive type fetch—then it must notify the other processors of its intent (commonly called a cross-invalidate request or XI request) because they can no longer own a copy of the line while the modification is being done as otherwise they could reference an old copy of the data when a more recent version exists elsewhere in the system, introducing a data integrity issue. Under a basic methodology, the processor could poll each processor in the system individually and wait for each processor to respond in order to ensure that the correct ownership state was obtained within each remote processor cache. But in the case where the processors are connected by a shared level of cache and there are a multitude of processors, the time required for this transaction to occur would be quite large.

As a result, prior processor designs implemented a hardware cross-invalidate stack 51 in order to allow each processor within the system to enqueue a number of cross-invalidate requests within the remote processors. The stack is actively managed by the processor such that prior to initiating a new request to a given line, a compare is performed against the cross-invalidate stack to ensure that the processor does not need to give up ownership of a line before using the data again.

For lines that are held in read-only state by a given processor it is ensured by protocol that the processor will immediately give up ownership/processing of a line when comparing against the cross-invalidate stack. For lines held in an exclusive state, the processor may reject the cross invalidate if it is actively modifying/storing the line until such a point where the current store operations complete and it is safe to give up ownership of the line.

This invention lies in reserving a subset 54 (FIG. 2) of these cross-invalidate stack positions for remote node cross-invalidate requests where the line was initially found in a read-only state on the local node and as a result it is guaranteed to exist only in a read-only state on the remote node. As a result of this coherency behavior, when the request is launched from the local node to the remote nodes, if the local node is aware that there are available reserved cross-invalidate positions on all of the remote nodes, exclusivity of the line can be returned to the requesting processor within a fixed amount of time after the request launch. This time need only be sufficient for the request to poll the directory on the remote nodes such that the cross-invalidate request is guaranteed to be enqueued on the remote processor's bias stacks. As a result, by the time exclusivity is returned to the processor it is ensured that all of the remote processors will be forced to observe the cross-invalidate requests and give up processing of the target line.

As will be understood, the management algorithm contemplated by this invention improves the system contention for resources through actively managing the processors cross-invalidate stacks on a given node. As described, this occurs by reserving a number of slots within the stack for requesters from each remote node, such that when a remote operation enters a given pipeline, the remote request has a position within the processors cross-invalidate stack already reserved for it and the requester cannot be rejected as a result of the cross-invalidate stack being full.

Further, the management algorithm contemplated by this invention continues to improve on this principle by actively communicating the availability of these reserved cross-invalidate positions back to each of the remote nodes, such that the remote nodes know if they should send a request that may require use of the stack prior to launching the request. With this communication, each of the remote nodes can actively arbitrate and manage the requests being launched such that requests that do not require the use of the cross-invalidate stack can be given priority during times when the stack is not available.

Finally, the management algorithm contemplated by this invention improves on the management of the buses required to send these requests to any of a number of processors on a given node, by actively throttling requests such that bus conflict conditions are actively avoided.

All together this algorithm makes it possible for a given node that launches a request to a plurality of remote nodes, to be able to determine the exact point at which its cross-invalidate requests will be placed on a given processors cross-invalidate stack without requiring the use of any response from the remote nodes. In this manner, exclusivity of a line could be returned to a given processor for an Exclusive Fetch request a given number of cycles after the request is launched from the requesting node to the remote nodes, and before any response is received from the remote nodes, This dramatically reduces the latency on certain types of remote operations and measurably improves system performance.

In implementation, this invention requires several basic changes on the requesting and remote nodes, as previously mentioned. The primary item is segmenting the processors cross-invalidate stacks into a section for the local requesters and a section for the remote requesters, with potentially subsegments in the remote group where segments would be dedicated to each of the remote nodes present in the system (FIG. 2). Next, a communication algorithm between a requesting node and all of the remote nodes is required to effectively manage the cross-invalidate positions along with an improved fabric/interconnect protocol which actively inhibits requests based on availability of these cross-invalidate positions. Finally, on each of the remote nodes, an enhanced bus management algorithm is provided to prevent any remaining conflicts for these operations such that once they are inbound to a remote node, it is impossible for the request to receive a reject when attempting to send the cross-invalidate to the processor.

All together, this results in the guarantee of the cross-invalidate being sent to the processors on a remote node, once the request is launched from the requesting node. This allows the requesting node to effectively count a pre-determined number of cycles before returning exclusivity to the requesting processor, without having to wait for any response from the remote node (where traditionally there would be a wait for the final responses).

In the drawings and specifications there has been set forth a preferred embodiment of the invention and, although specific terms are used, the description thus given uses terminology in a generic and descriptive sense only and not for purposes of limitation.

Figure 6:
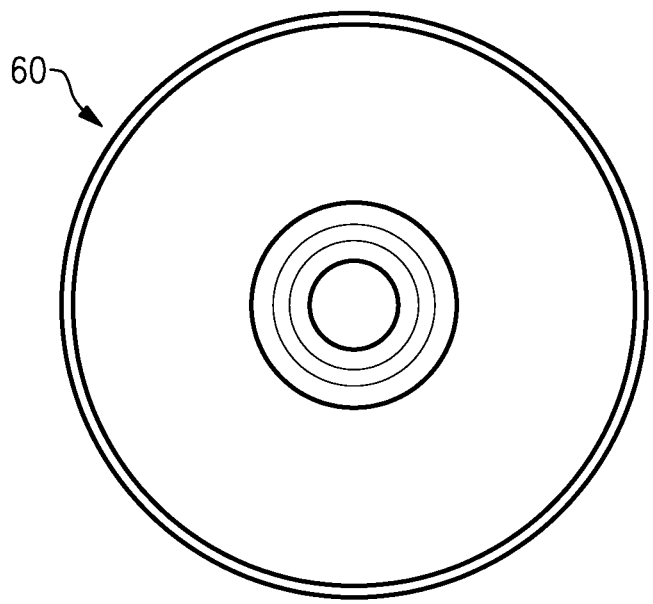
FIG. 6 illustrates one form of computer readable media bearing program code which executes on a multi-node data handling system to implement this invention The detailed description explains the preferred embodiments of the invention, together with advantages and features, by way of example with reference to the drawings.

As one example, one or more aspects of the present invention can be included in an article of manufacture (e.g., one or more computer program products) having, for instance, tangible computer usable media, indicated at 60 in FIG. 6. The media has embodied therein, for instance, computer readable program code for providing and facilitating the capabilities of the present invention. The article of manufacture can be included as a part of a computer system or sold separately. Machine readable storage mediums may include fixed hard drives, optical discs such as the disc 60, magnetic tapes, semiconductor memories such as read only memories (ROMs), programmable memories (PROMs of various types), flash memory, etc. The article containing this computer readable code is utilized by executing the code directly from the storage device, or by copying the code from one storage device to another storage device, or by transmitting the code on a network for remote execution.

What is claimed is:

1. A method of operating a multi-node data handling system in which each node has a cross-invalidate stack and access to cache memory associated with the node, wherein each of the cross-invalidate stacks comprise a first section for local cache requests and a second section for remote cache requests, the method comprising:
   determining whether the second sections of all of the cross-invalidate stacks of remote nodes are available to receive a request launched from a local node;
   based on a processor requesting a write line to a line in the local cache, performing:
      based on determining that all the second sections are available and that the line to be written to is held in the local cache as read only, launching the cross-invalidate request immediately and making the line held in the local cache exclusively owned by the local cache without waiting for a response to the launched cross-invalidate request.

2. The method according to claim 1 wherein the making the line held in the local cache exclusively owned further comprises:
   returning exclusivity of the line to the processor a predetermined amount of time after the launching the cross-invalidate request.

3. The method according to claim 1 further comprising:
   segmenting the second sections of the cross-invalidate stacks into a plurality of subsegments, each subsegment corresponding to one of a plurality of nodes of the multi-node data handling system; and
   reserving slots within the subsegments, each slot reserved for remote node cross-invalidate requests initiated by a corresponding node of the plurality of nodes.

4. The method according to claim 3 further comprising communicating by each node the availability of reserved slots within the second section of the cross-invalidate stack of the respective node.

5. The method according to claim 4 further comprising receiving at a node prior to launching a request from that node a communication indicating the availability of reserved slots within the second sections of the cross-invalidate stacks of each remote node.

6. The method according to claim 4 further comprising receiving at a node prior to launching a request from that node a communication indicating the unavailability of reserved slots within the second sections of the cross-invalidate stacks of each remote node.

7. The method according to claim 1, further comprising:
   delaying the launching of the cross-invalidate request to permit launching of other requests, the other requests not requiring use of the cross-invalidate stacks based on any one of:
   any of the cross-invalidate stacks of the remote nodes being unavailable; and
   the line to be written not being held in the local cache.

8. An apparatus comprising:
   a data handling system having cache memory and a plurality of processors and nodes;
   each of said nodes having a cross-invalidate stack;
   each said cross-invalidate stack being segmented into a first section for local cache requests and a second section for remote cache requests; and
   instructions executing in each node which
      determine whether the second sections of all of the cross-invalidate stacks of remote nodes are available to receive a request launched from a local node; and
      based on a processor requesting a write to a line in the local cache performing:
         determining that all the second sections are available and that the line to be written is held in the local cache as read only;

launching a cross-invalidate request immediately and make the line held in the local cache exclusively owned by the local cache without waiting for a response to the launched cross-invalidate request.

9. The apparatus according to claim 8 wherein the making the line held in the local cache exclusively owned further comprises:
   returning exclusivity of the line to the processor a predetermined amount of time after the launching the cross-invalidate request.

10. The apparatus according to claim 8 wherein
    the second sections of the cross-invalidate stacks are segmented into a plurality of subsegments, each subsegment corresponding to one of a plurality of nodes of the multi-node data handling system; and
    each subsegment having slots within the subsegment reserved for remote node cross-invalidate requests initiated by a corresponding node of the plurality of nodes of the multi-node data handling system.

11. The apparatus according to claim 10 further comprising instructions executing on each node which communicates the availability of reserved slots within the second section of the cross-invalidate stack of the respective node.

12. The apparatus according to claim 11 wherein instructions executing on each node receive at a node prior to launching a request from that node a communication indicating the availability of reserved slots within the second sections of the cross-invalidate stacks of each remote node.

13. The apparatus according to claim 11 wherein instructions executing on each node receive at a node prior to launching a request from that node a communication indicating the unavailability of reserved slots within the second sections of the cross-invalidate stacks of each remote node.

14. The apparatus according to claim 8, wherein instructions executing in each node further comprise:
    delaying the launching of the cross-invalidate request to permit launching of other requests, the other requests not requiring use of the cross-invalidate stacks based on any one of:
    any of the cross-invalidate stacks of the remote nodes being unavailable; and
    the line to be written not being held in the local cache.

15. A computer program product comprising:
    a non-transitory tangible storage media readable by a processing circuit and storing instructions for execution by the processing circuits of a multi-node data handling system in which each node has a cross-invalidate stack and access to cache memory associated with the node, wherein each of the cross-invalidate stacks comprise a first section for local cache requests and a second section for remote cache requests, the instructions when executing effectuating a method comprising:
    determining whether the second sections of all of the cross-invalidate stacks of remote nodes are available to receive a request launched from a local node;
    based on a processor requesting a write to line in the local cache, performing:
        based on determining that all the second sections are available and that the line to be written to is held in the local cache as read only, launching the cross-invalidate request immediately and making the line held in the local cache exclusively owned by the local cache without waiting for a response to the launched cross-invalidate request.

16. The computer program product according to claim 15 wherein the making the line held in the local cache exclusively owned further comprises:
    returning exclusivity of the line to the processor a predetermined amount of time after the launching the cross-invalidate request.

17. The computer program product according to claim 15 wherein the method further comprises:
    segmenting the second sections of the cross-invalidate stacks into a plurality of subsegments, each subsegment corresponding to one of a plurality of nodes of the multi-node data handling system; and
    reserving slots within the subsegments, each slot reserved for remote node cross-invalidate requests initiated by a corresponding node of the plurality of nodes.

18. The computer program product according to claim 17 wherein the method further comprises communicating by each node the availability of reserved slots within the second section of the cross-invalidate stack of each remote node.

19. A computer program product according to claim 18 wherein the method further comprises receiving at a node prior to launching a request from that node a communication indicating one of the availability or unavailability of reserved slots within the second sections of the cross-invalidate stacks.

20. The computer program product according to claim 15, wherein the method further comprises:
    delaying the launching of the cross-invalidate request to permit launching of other requests, the other requests not requiring use of the cross-invalidate stacks based on any one of:
    any of the cross-invalidate stacks of the remote nodes being unavailable; and
    the line to be written not being held in the local cache.

* * * * *